(12) United States Patent
Ueda (10) Patent No.: US 12,134,363 B2
(45) Date of Patent: Nov. 5, 2024

(54) VEHICLE OCCUPANT RESTRAINT DEVICE

(71) Applicant: TOYOTA JIDOSHA KABUSHIKI KAISHA, Toyota (JP)

(72) Inventor: Takuya Ueda, Ama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/408,582

(22) Filed: Jan. 10, 2024

(65) Prior Publication Data

US 2024/0286571 A1  Aug. 29, 2024

(30) Foreign Application Priority Data

Feb. 24, 2023  (JP) .................................. 2023-027798

(51) Int. Cl.
| | |
|---|---|
| *B60R 21/207* | (2006.01) |
| *B60R 21/00* | (2006.01) |
| *B60R 21/015* | (2006.01) |
| *B60R 21/231* | (2011.01) |
| *B60R 21/2338* | (2011.01) |
| *B60R 21/264* | (2006.01) |

(52) U.S. Cl.
CPC ...... *B60R 21/207* (2013.01); *B60R 21/01512* (2014.10); *B60R 21/2338* (2013.01); *B60R 21/264* (2013.01); *B60R 2021/0006* (2013.01); *B60R 2021/23161* (2013.01)

(58) Field of Classification Search
CPC ............ B60R 21/207; B60R 21/01512; B60R 21/2338; B60R 2021/0006; B60R 2021/23161; B60R 21/23138; B60R 2021/23146; B60R 2021/23382
See application file for complete search history.

(56) References Cited

U.S. PATENT DOCUMENTS

| | | | |
|---|---|---|---|
| 5,507,519 A * | 4/1996 | Schettler-Kohler | ........................ B60R 21/23138 280/730.1 |
| 6,793,243 B2 * | 9/2004 | Husby | ............... B60R 21/01504 280/743.2 |

(Continued)

FOREIGN PATENT DOCUMENTS

| | | |
|---|---|---|
| EP | 3954587 A1 | 2/2022 |
| JP | 2019-172023 A | 10/2019 |

(Continued)

*Primary Examiner* — Amy R Weisberg
*Assistant Examiner* — Tiffany L Webb
(74) *Attorney, Agent, or Firm* — SOLARIS Intellectual Property Group, PLLC (57) ABSTRACT

A vehicle occupant restraint device, including: a driver's seat and a front passenger seat; a recognition device to recognize whether or not an occupant is seated at the front passenger seat; a center airbag; a regulating member provided at the interior of the center airbag to regulate a thickness of the center airbag to a thickness that is suitable at a time at which an occupant is seated at the front passenger seat; and a release device provided at the interior of the center airbag to release regulation by the regulating member, at a time at which a side-on collision of the vehicle is detected or at a time at which a side-on collision of the vehicle is predicted, in a case in which the recognition device has recognized that an occupant is not seated at the front passenger seat.

4 Claims, 6 Drawing Sheets

(56) References Cited

U.S. PATENT DOCUMENTS

| | | | | |
|---|---|---|---|---|
| 8,226,119 | B2* | 7/2012 | Dong | B60R 21/2338 |
| | | | | 280/743.2 |
| 9,358,943 | B2* | 6/2016 | Börjeson | B60R 21/23138 |
| 10,099,645 | B2* | 10/2018 | Song | B60R 21/207 |
| 11,267,427 | B1* | 3/2022 | Deng | B60R 21/207 |
| 11,787,361 | B1* | 10/2023 | Patel | B60R 21/2338 |
| | | | | 280/730.2 |
| 11,851,020 | B1* | 12/2023 | Deng | B60R 21/23138 |
| 2009/0001695 | A1* | 1/2009 | Suzuki | B60R 21/231 |
| | | | | 280/730.2 |
| 2024/0190379 | A1* | 6/2024 | Mashiko | B60R 21/232 |

FOREIGN PATENT DOCUMENTS

| | | |
|---|---|---|
| JP | 2019-172029 A | 10/2019 |
| JP | 2019-177717 A | 10/2019 |
| JP | 2019-177724 A | 10/2019 |
| JP | 2022-032932 A | 2/2022 |

\* cited by examiner

VEHICLE OCCUPANT RESTRAINT DEVICE

CROSS-REFERENCE TO RELATED APPLICATION

This application is based on and claims priority under 35 USC 119 from Japanese Patent Application No. 2023-027798, filed on Feb. 24, 2023, the disclosure of which is incorporated by reference herein.

BACKGROUND

Technical Field

The present disclosure relates to a vehicle occupant restraint device.

Related Art

A far side airbag device that is installed at a side portion at a vehicle width direction inner side (central side) of a driver's seat, and that inflates and deploys an airbag with inflation gas between the driver's seat and an adjacent front passenger seat is conventionally known (refer to, for example, Japanese Patent Application Laid-Open (JP-A) No. 2022-032932).

It should be noted that, at a time at which there is only one occupant, who is seated at the driver's seat, in order to ensure restraining performance of a center airbag (far side airbag) in a case in which a side door at the front passenger seat side has a side-on collision, for example, it is preferable that the thickness (length along the seat width direction) of the center airbag upon completion of inflation and deployment be set thicker. Namely, in a case of one occupant, it is effective to apply reaction force earlier to the upper body of the occupant who is moving toward the vehicle width direction inner side due to inertia force, and in order to do so, it is advantageous that the thickness of the center airbag at the time of completion of inflation and deployment is thicker.

On the other hand, in a case in which there are two occupants due to there also being an occupant at the front passenger seat, at a time of a side-on collision of a side door at the driver's seat side, for example, a center airbag upon completion of inflation and deployment is sandwiched between the occupant of the driver's seat and the occupant of the front passenger seat. Therefore, in a case in which the thickness of the center airbag at the time of completion of inflation and deployment is thicker, an external force that is opposite in direction from an external force toward an entry direction (vehicle width direction inner side) of the side door is input to the occupant of the driver's seat by the center airbag, and the deflection amounts (injury values) of the chest region and the abdomen region of the occupant of the driver's seat are increased.

Further, in a case in which there are two occupants, a reaction force of the center airbag in order to avoid a collision between the head of the occupant that is seated at the driver's seat and the head of the occupant that is seated at the front passenger seat is not required to an amount of a reaction force of the center airbag in the case of there being one occupant. Therefore, in order to suppress the deflection amounts (injury values) of the chest region and the abdomen region of the occupant of the driver's seat to low amounts/values in a case in which there are two occupants, it is preferable that the thickness of the center airbag be set to be thin. In this manner, there is a difference between a case in which there is one occupant and a case in which there are two occupants in terms of the thickness of the center airbag to effectively restrain the occupant(s).

SUMMARY

An object of the present disclosure is to provide a vehicle occupant restraint device that enables an occupant to be effectively restrained by a center airbag at a time at which a vehicle side-on collision of a vehicle is detected or a side-on collision of a vehicle is predicted, whether in a case in which there is only one occupant, who is seated at the driver's seat, or in a case in which there are two occupants who are seated at the driver's seat and the front passenger seat.

In order to achieve the above-described object, a vehicle occupant restraint device according to a first aspect of the present disclosure includes: a driver's seat and a front passenger seat which are provided at a vehicle interior of a vehicle; a recognition device that recognizes whether or not an occupant is seated at the front passenger seat; a center airbag that is provided at a side portion at a vehicle width direction inner side of a seatback of the driver's seat, and that inflates and deploys toward a vehicle width direction inner side of an occupant seated at the driver's seat due to gas ejected from an inflator being supplied to an interior of the center airbag; a regulating member that is provided at the interior of the center airbag, and that regulates a thickness of the center airbag to a thickness that is suitable at a time at which an occupant is seated at the front passenger seat; and a release device that is provided at the interior of the center airbag, and that, at a time at which a side-on collision of the vehicle is detected or at a time at which a side-on collision of the vehicle is predicted, releases regulation by the regulating member in a case in which the recognition device has recognized that an occupant is not seated at the front passenger seat.

According to the first aspect of the present disclosure, the inflator is actuated at a time at which a side-on collision of the vehicle is detected or at a time at which a side-on collision of the vehicle is predicted, and gas ejected from the inflator is supplied to the interior of the center airbag. Therefore, the center airbag is inflated and deployed toward the vehicle width direction inner side of an occupant that is seated at the driver's seat.

It should be noted that the thickness of the center airbag is regulated to a thickness that is suitable at a time at which an occupant is seated at the front passenger seat, by the regulating member that is provided at the interior of the center airbag. Therefore, in a case in which there are two occupants due to there also being an occupant seated at the front passenger seat, the occupant that is seated at the driver's seat and the occupant that is seated at the front passenger seat are effectively restrained by the center airbag.

On the other hand, in a case in which it is recognized by the recognition device that an occupant is not seated at the front passenger seat, regulation by the regulating member is released by the release device. As a result, the thickness of the center airbag is increased, such that an occupant that is seated at the driver's seat is effectively restrained by the center airbag. Therefore, according to the present disclosure, whether in a case in which there is only one occupant, who is seated at the driver's seat, or in a case in which there are two occupants who are seated at the driver's seat and the front passenger seat, an occupant is effectively restrained by the center airbag at a time at which a side-on collision of the vehicle is detected or at a time at which a side-on collision of the vehicle is predicted.

A vehicle occupant restraint device according to a second aspect of the present disclosure is the vehicle occupant restraint device according to the first aspect, wherein: the regulating member is a tether that connects a seat width direction outer side base cloth of the center airbag and a seat width direction inner side base cloth of the center airbag; and the release device includes a cutter that is configured to cut the tether.

According to the second aspect of the present disclosure, the regulating member is a tether that connects the seat width direction outer side base cloth of the center airbag and the seat width direction inner side base cloth of the center airbag, and the release device includes a cutter that is configured to cut the tether. Therefore, in a case in which it is recognized by the recognition device that an occupant is not seated at the front passenger seat, the thickness of the center airbag is increased earlier.

A vehicle occupant restraint device according to a third aspect of the present disclosure is the vehicle occupant restraint device according to the first aspect, wherein: the regulating member is a tether that connects a seat width direction outer side base cloth of the center airbag and a seat width direction inner side base cloth of the center airbag, one end portion side of the tether and another end portion side of the tether being connected by a thread-like member, in a state in which an intermediate portion of the tether is slack; and the release device includes a cutter that is configured to cut the thread-like member.

According to the third aspect of the present disclosure, the regulating member is a tether that connects the seat width direction outer side base cloth of the center airbag and the seat width direction inner side base cloth of the center airbag, one end portion side of the tether and another end portion side of the tether being connected by the thread-like member, in a state in which the intermediate portion of the tether is slack, and the release device includes a cutter that is configured to cut the thread-like member. Therefore, in a case in which it is recognized by the recognition device that an occupant is not seated at the front passenger seat, the thickness of the center airbag is increased earlier. In addition, even if the thickness of the center airbag is increased, the seat width direction outer side base cloth of the center airbag and the seat width direction inner side base cloth of the center airbag remain connected by the tether, such that the thickness of the center airbag is also appropriately set.

A vehicle occupant restraint device according to a fourth aspect of the present disclosure is the vehicle occupant restraint device according to the first aspect, wherein: the regulating member is a tether that connects a seat width direction outer side base cloth of the center airbag and a seat width direction inner side base cloth of the center airbag, the tether being taken up against an urging force that urges one end portion side of the tether in a counter-winding direction; and the release device is configured by an actuator that is configured to lock and to unlock the tether that has been taken up.

According to the fourth aspect of the present disclosure, the regulating member is a tether that connects the seat width direction outer side base cloth of the center airbag and the seat width direction inner side base cloth of the center airbag, the tether being taken up against the urging force that urges one end portion side of the tether in a counter-winding direction, and the release device is configured by an actuator that is configured to lock and to unlock the tether that has been taken up. Therefore, in a case in which it is recognized by the recognition device that an occupant is not seated at the front passenger seat, the thickness of the center airbag is increased earlier. In addition, even if the thickness of the center airbag is increased, the seat width direction outer side base cloth of the center airbag and the seat width direction inner side base cloth of the center airbag remain connected by the tether, such that the thickness of the center airbag is also appropriately set.

As described above, whether in a case in which there is only one occupant, who is seated at the driver's seat, or in a case in which there are two occupants who are seated at the driver's seat and the front passenger seat, the vehicle occupant restraint device according to the present disclosure enables an occupant to be effectively restrained by the center airbag at a time at which a side-on collision of the vehicle is detected or at a time at which a side-on collision of the vehicle is predicted.

BRIEF DESCRIPTION OF THE DRAWINGS

Exemplary embodiments of the present disclosure will be described in detail based on the following figures, wherein.

DETAILED DESCRIPTION

Detailed explanation follows regarding exemplary embodiments of the present disclosure, based on the drawings. It should be noted that for convenience of explanation, in the respective drawings, as appropriate, the arrow UP indicates an upward direction of a vehicle and a vehicle seat, the arrow FR indicates a frontward direction of the vehicle and the vehicle seat, and the arrow RH indicates a rightward direction of the vehicle and the vehicle seat. Therefore, in the following explanation, in cases in which up-down, front-rear, and left-right directions are described without any particular notation to the contrary, these indicate up and down, front and rear, and left and right with respect to the vehicle and the vehicle seat. Further, the left-right direction is the same as a vehicle width direction and a seat width direction.

Figure 1:
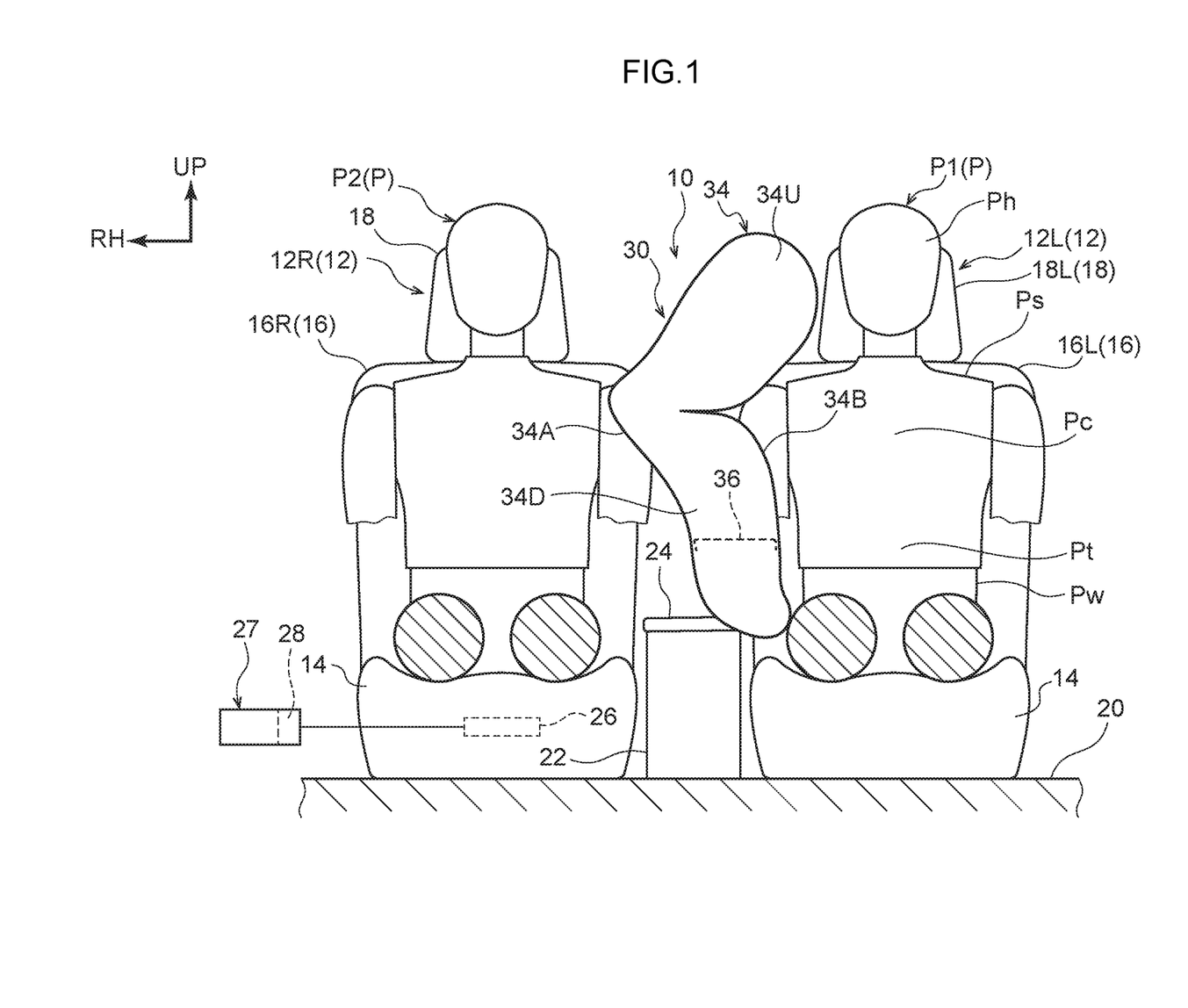
FIG. 1 is a schematic front view illustrating an inflated and deployed state of a center airbag of a vehicle occupant restraint device according to a first exemplary embodiment, in a case in which there are two occupants.
Figure 2:
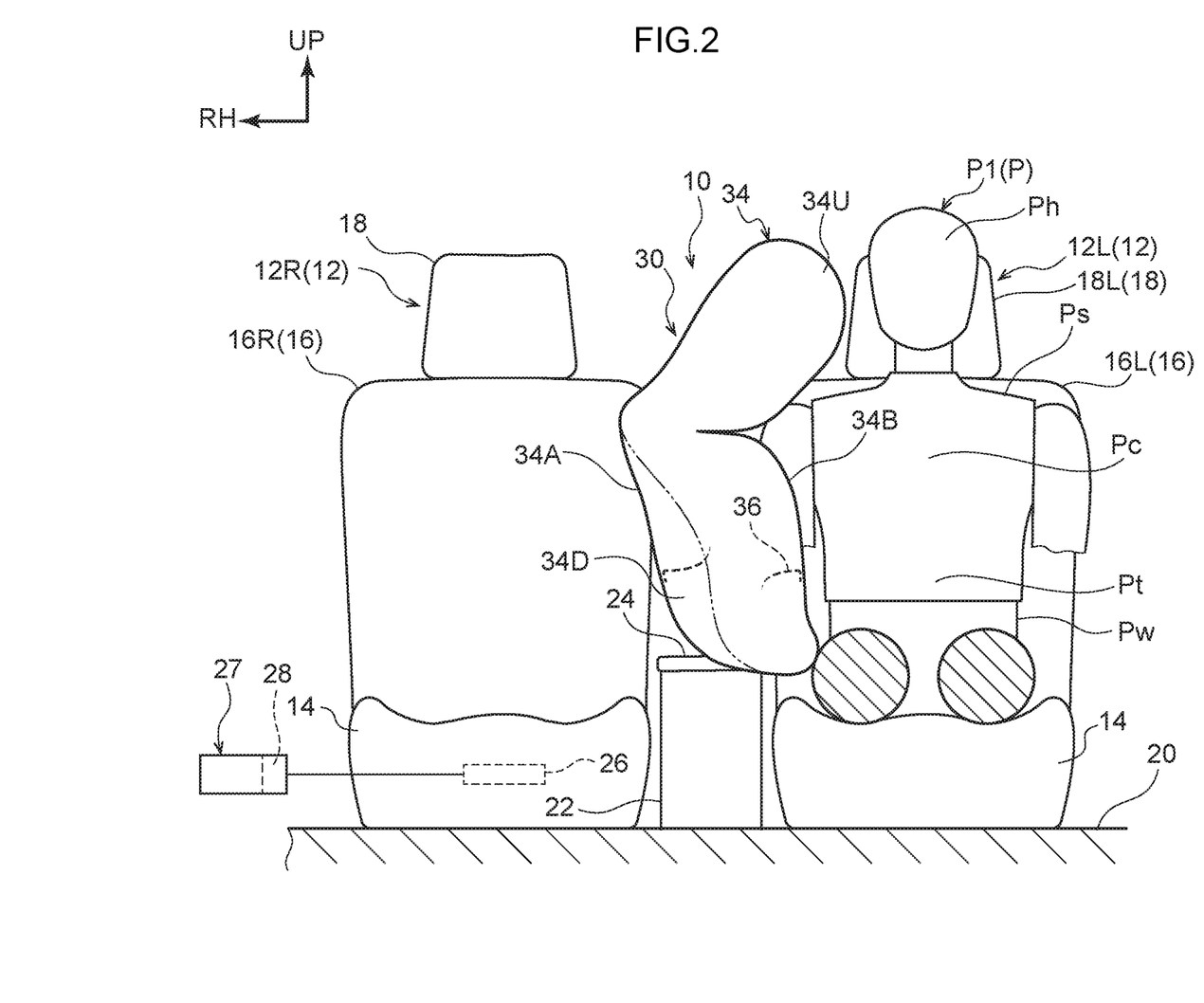
FIG. 2 is a schematic front view illustrating an inflated and deployed state of the center airbag of the vehicle occupant restraint device according to the first exemplary embodiment, in a case in which there is one occupant.
Figure 3:
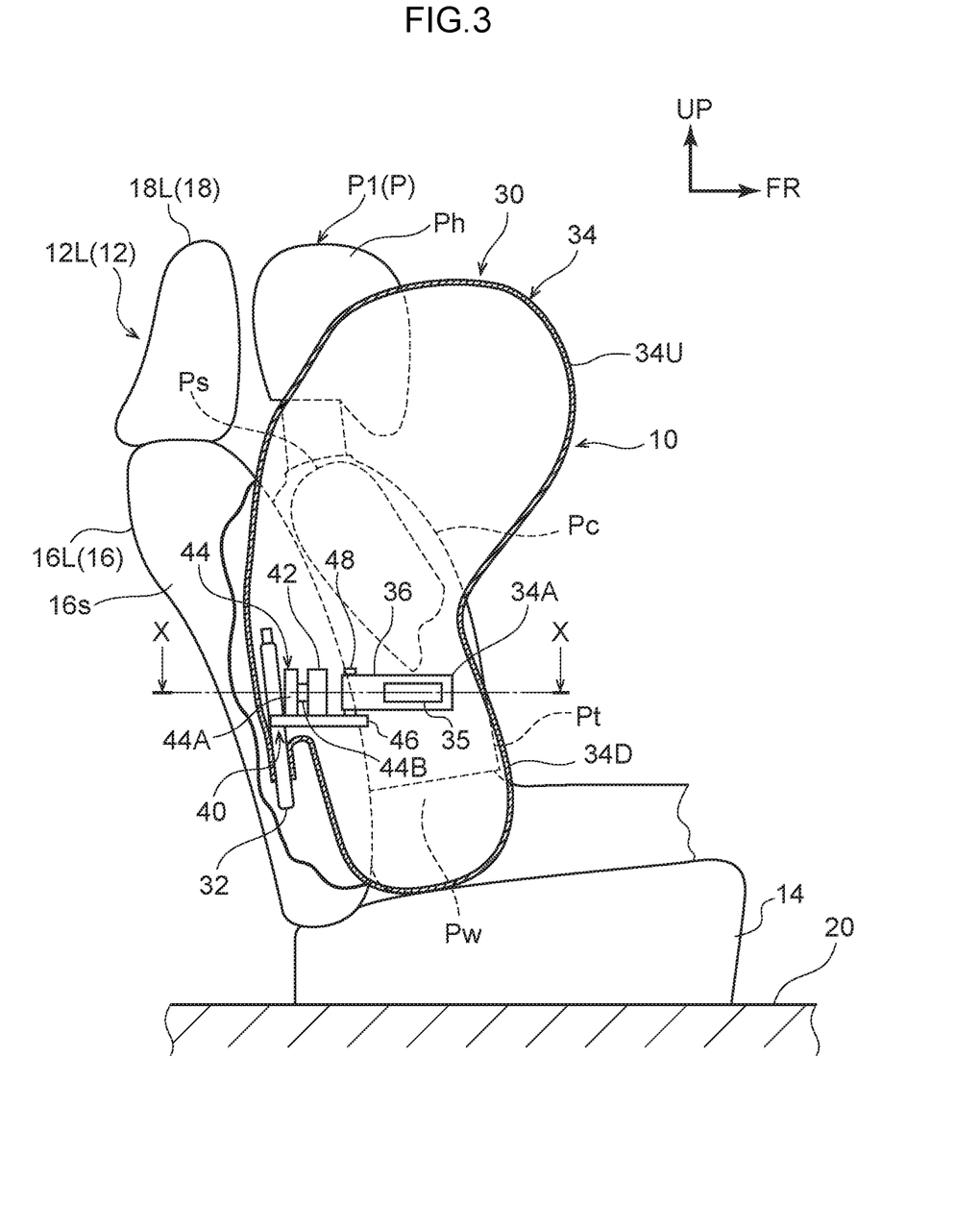
FIG. 3 is a schematic side view illustrating an internal structure of the center airbag of the vehicle occupant restraint device according to the first exemplary embodiment.

Further, as an example, a vehicle seat 12 illustrated in FIG. 1 to FIG. 3 is a front seat provided at a vehicle interior of a left hand drive vehicle. Therefore, in the following explanation, there are cases in which the vehicle seat 12 at the driver's seat side (the left side) is referred to as the "driver's seat 12L" and the vehicle seat 12 at the front passenger seat side (the right side) is referred to as the "front passenger seat 12R". Further, when each portion of the driver's seat 12L is described, there are cases in which the alphabetic character "L" is appended to a reference numeral.

Further, as an example, an "occupant P" illustrated in FIG. 1 to FIG. 3 is an occupant corresponding to an AM50 (50th percentile American adult males) World Side Impact Dummy (World SID). In addition, in the following explanation, there are cases in which an occupant P, serving as a driver that is seated at the driver's seat 12L, is referred to as "occupant P1", and an occupant P that is seated at the front passenger seat 12R is referred to as "occupant P2".

First Exemplary Embodiment

First, a first exemplary embodiment will be explained. As illustrated in FIG. 1 to FIG. 3, the vehicle seat 12 configuring the vehicle occupant restraint device 10 according to the first exemplary embodiment includes a seat cushion 14 at which the occupant P is seated (the seat cushion 14 supporting the buttocks and thighs of the occupant P), a seatback 16 that supports a back of the occupant P, and a headrest 18 that supports a head Ph of the occupant P.

In a side view viewed from a vehicle width direction (seat width direction), the seat cushion 14 extends in the front-rear direction, and the seatback 16 is coupled to a rear end portion of the seat cushion 14 so as to be rotatable with the seat width direction as an axial direction, and extends in the up-down direction. The headrest 18 is provided so as to be capable of moving up and down at a seat width direction central portion of an upper end portion of the seatback 16. The occupant P is restrained at the vehicle seat 12 by a non-illustrated seatbelt device.

As illustrated in FIG. 1 and FIG. 2, a console box 22 is provided at a vehicle width direction central portion (between the driver's seat 12L and the front passenger seat 12R) of the floor 20 of the vehicle interior. The console box 22 is a rectangular hollow box with a length direction of the console box 22 being in the front-rear direction in plan view, and an upper portion of the console box 22 is open and is configured to be opened and closed by a lid portion 24 having a predetermined thickness. It should be noted that the height to the upper face of the lid portion 24 of the console box 22 is such that the occupant P can place an elbow portion (not illustrated in the drawings) thereon without having to adopt an uncomfortable posture.

As illustrated in FIG. 1 and FIG. 2, a seating sensor 26 is provided at a lower side of the front passenger seat 12R. The seating sensor 26 is electrically connected to a recognition device 28 that is provided at the vehicle. Namely, the configuration is such that the recognition device 28 recognizes whether or not the occupant P2 is seated at the front passenger seat 12R by receiving or not receiving a detection signal from the seating sensor 26. It should be noted that that the recognition device 28 includes a built-in control device 27 that controls each component provided in the vehicle.

A center airbag device 30 is provided at a right side portion (hereafter referred to as "right side portion 16S"), which is a side portion at a vehicle width direction inner side of the seatback 16L of the driver's seat 12L. As illustrated in FIG. 3, the center airbag device 30 includes an inflator 32 that is embedded at the right side portion 16S of the seatback 16L, and a center airbag 34 (far side airbag) into which gas ejected from an inflator 32 is supplied.

The inflator 32 is a cylinder-type gas generating device that is formed in a substantially cylindrical shape, and an axial direction of the inflator 32 is a direction (substantially the up-down direction) along a side frame (not illustrated in the drawings) that configures a frame at both the left and right side portions of the seatback 16L. The inflator 32 is actuated at a time at which a vehicle side-on collision has been detected or predicted (hereinafter referred to as "at a time of a side-on collision"), and is capable of instantaneously supplying gas to an interior of the center airbag 34. Therefore, the center airbag 34 is configured to be quickly inflated and deployed.

The center airbag 34 is folded and embedded at the right side portion 16S of the seatback 16L, and by gas that is ejected from the inflator 32 being supplied to the interior of the center airbag 34, the epidermis, which extends from a lower end portion to an upper end portion of a front wall of the right side portion 16S, is broken, and the center airbag 34 is inflated and deployed toward at least a vehicle width direction inner side of a waist region Pw, an abdomen region Pt, a chest region Pc, a shoulder region Ps, and the head Ph of the occupant P1 that is seated at the driver's seat 12L.

Specifically, in side view, the center airbag 34 that has been inflated and deployed (after inflation and deployment has been completed) is disposed from the vicinity of an upper end portion of the headrest 18L to the vicinity of a lower end portion of the seatback 16L (further toward the lower side than the lid portion 24 of the console box 22). An upper portion 34U of the center airbag 34 is formed in a substantially elliptical shape that bulges further toward a front side than a lower portion 34D side that restrains the abdomen region Pt and the waist region Pw of the occupant P1, so as to be capable of restraining the head Ph of the occupant P1 (see FIG. 3). It should be noted that the center airbag 34 is formed in a single bag shape by sewing together an outer peripheral edge portion of a seat width direction outer side base cloth 34A and an outer peripheral edge portion of a seat width direction inner side base cloth 34B (see FIG. 1 and FIG. 2).

Further, as illustrated in FIG. 1, at the interior of the lower portion 34D side of the center airbag 34, a tether 36, serving as a regulating member that regulates the thickness (length along the seat width direction) of the lower portion 34D side of the center airbag 34 to a thickness that is suitable at a time at which the occupant P2 is seated at the front passenger seat 12R, is provided.

Figure 4A:
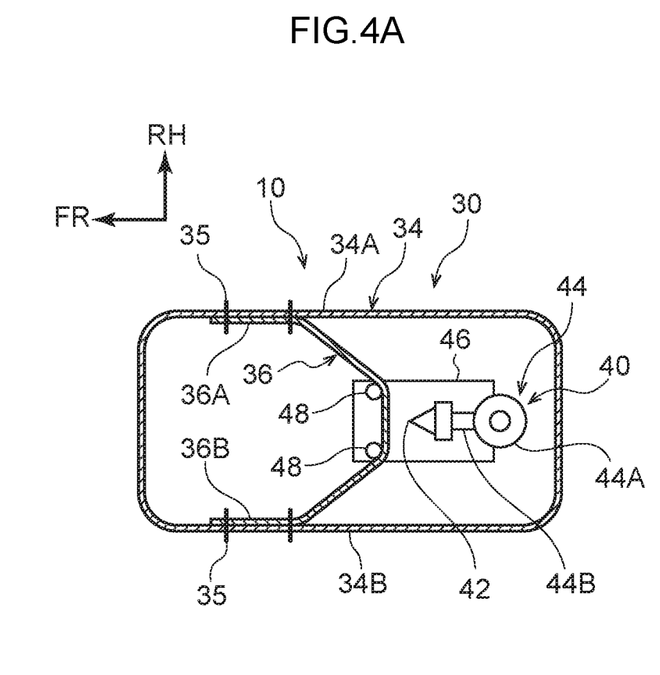
FIG. 4A is a schematic cross-sectional view taken along the line X-X in FIG. 3, illustrating the interior of the center airbag of the vehicle occupant restraint device according to the first exemplary embodiment, in a case in which there are two occupants.
Figure 4B:
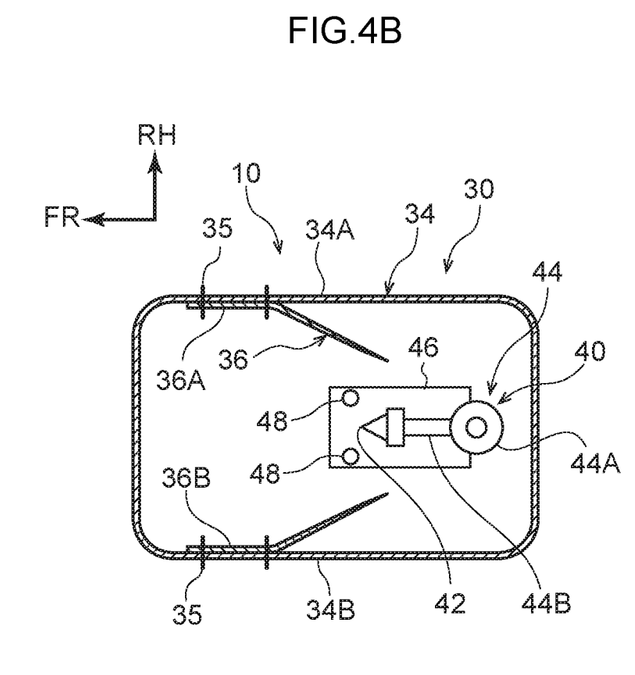
FIG. 4B is a schematic cross-sectional view taken along the line X-X in FIG. 3, illustrating the interior of the center airbag of the vehicle occupant restraint device according to the first exemplary embodiment, in a case in which there is one occupant.

Specifically, as illustrated in FIG. 3, FIG. 4A, and FIG. 4B, the tether 36 is formed in a belt shape having a predetermined width, and connects the vehicle width direction outer side base cloth 34A and the vehicle width direction inner side base cloth 34B of the center airbag 34.

Namely, one end portion 36A of the tether 36 is attached to the seat width direction outer side base cloth 34A by a sewn portion 35 having a substantially rectangular frame shape with a length direction of the sewn portion 35 being in the front-rear direction. Similarly, another end portion 36B of the tether 36 is attached to the seat width direction inner side base cloth 34B by a sewn portion 35 having a substantially rectangular frame shape with a length direction of the sewn portion 35 being in the front-rear direction.

Further, a release device 40, which releases regulation by the tether 36 under control of the control device 27 when the occupant P2 is recognized as not being seated at the front passenger seat 12R by the recognition device 28 at a time of a vehicle side-on collision, is provided at the interior of the lower portion 34D side of the center airbag 34.

Specifically, as illustrated in FIG. 3, FIG. 4A, and FIG. 4B, the release device 40 includes a cutter 42 that cuts an intermediate portion of the tether 36, and an actuator 44 that supports the cutter 42 so as to be capable of moving in the front-rear direction. The actuator 44 includes a cylindrical main body portion 44A, and a rod portion 44B, which has a rectangular cross-section and is supported by the main body portion 44A so as to be capable of moving in the front-rear direction, and the cutter 42 is integrally attached to a leading end of the rod portion 44B.

The main body portion 44A is electrically connected to the control device 27, and is installed at a left-right direction central portion of a rear end portion of an upper face of a rectangular flat plate-shaped pedestal 46 that is supported by a side frame or the like of the seatback 16L. The rod portion 44B is configured to move in the front-rear direction by the main body portion 44A being driven under control of the control device 27. For example, a rack gear (not illustrated in the drawings) is formed at a base side (a side opposite from the leading end) of the rod portion 44B, and a pinion gear (not illustrated in the drawings) that meshes with the rack gear is provided at the main body portion 44A. In such a configuration, the rod portion 44B is moved by rotating the pinion gear of the main body portion 44A under the control of the control device 27.

Further, cylindrical hooking members 48, which each have an up-down direction as an axial direction, are respectively provided protruding from a left side and a right side of a front end portion of the upper face of the pedestal 46 so as to be separated in the left-right direction, and the intermediate portion of the tether 36 is hooked from a rear side to each hooking member 48. Therefore, the configuration is such that, at the interior of the center airbag 34 after inflation and deployment has been completed, a portion of the tether 36 that is hooked on the respective hooking members 48, and to which a predetermined tension has been applied due to the internal pressure of the center airbag 34, can be cut by the cutter 42 that advances.

As illustrated in FIG. 4A, at the interior of the center airbag 34 after inflation and deployment has been completed, the thickness of the lower portion 34D side of the center airbag 34 is limited by the tether 36 to which a predetermined tension has been applied due to the internal pressure of the center airbag 34. This thickness is set as the thickness of the center airbag 34 that effectively restrains the occupant P1 of the driver's seat and the occupant P2 of the front passenger seat at a time at which there are two occupants due to there also being the occupant P2 that is seated at the front passenger seat 12R.

Next, operation of the vehicle occupant restraint device 10 according to the first exemplary embodiment configured as described above will be explained.

At a time of a vehicle side-on collision, the inflator 32 is actuated, and gas ejected from the inflator 32 is supplied to the interior of the center airbag 34. When this occurs, the epidermis, which extends from the lower end portion to the upper end portion of the front wall of the right side portion 16S of the seatback 16L of the driver's seat 12L, is broken due to internal pressure (inflation pressure) of the center airbag 34 that has started to inflate due to the supply of gas.

Namely, the center airbag 34 is inflated and deployed toward the right side surfaces (vehicle width direction inner sides) of the waist region Pw, the abdomen region Pt, the chest region Pc, the shoulder region Ps, and the head Ph of the occupant P1 that is seated at the driver's seat 12 L. Therefore, the right side surfaces from the waist region Pw to the head Ph of the occupant P1 are covered from the right side by the center airbag 34. This enables the right side surfaces from the head Ph to the waist region Pw of the occupant P1, which move toward the vehicle width direction inner side under inertia force, to be restrained by the center airbag 34 at a time of a vehicle side-on collision.

It should be noted that the thickness of the center airbag 34 is regulated to a thickness that is suitable at a time at which the occupant P2 is seated at the front passenger seat 12R, by the tether 36 provided at the interior of the lower portion 34D side. Therefore, as illustrated in FIG. 1, in a case in which there are two occupants due to there also being the occupant P2 who is seated at the front passenger seat 12R, the occupant P1 that is seated at the driver's seat 12L and the occupant P2 that is seated at the front passenger seat 12R can be effectively restrained by the center airbag 34.

Namely, at a time of a side-on collision of a side door (not illustrated in the drawings) at a driver's seat side, for example, in a case in which there are two occupants due to there also being the occupant P2 that is seated at the front passenger seat 12R, the center airbag 34 at the time of completion of inflation and deployment is sandwiched between the occupant P1 of the driver's seat and the occupant P2 of the front passenger seat. However, particularly in a case in which the thickness at the lower portion 34D side of the center airbag 34 at the time of completion of inflation and deployment of the center airbag 34 is thicker, an external force that is opposite in direction from an external force toward an entry direction (vehicle width direction inner side) of the side door is input to the occupant P1 of the driver's seat by the center airbag 34, and the deflection amounts (injury values) of the chest region Pc and the abdomen region Pt of the occupant P1 of the driver's seat are increased.

Further, in a case in which there are two occupants, a reaction force of the center airbag 34 in order to avoid a collision between the head Ph of the occupant P1 that is seated at the driver's seat and the head Ph of the occupant P2 that is seated at the front passenger seat is not required to an amount of a reaction force of the center airbag 34 in the case of there being one occupant. Therefore, in the first exemplary embodiment, the thickness of the center airbag 34, particularly at the lower portion 34D side, is set thinner by the tether 36 in a case in which there are two occupants. This enables the deflection amounts (injury values) of the chest region Pc and the abdomen region Pt of the occupant P1 of the driver's seat to be suppressed to low amounts/values.

On the other hand, as illustrated in FIG. 2, when it is recognized by the recognition device 28 that the occupant P2 is not seated at the front passenger seat 12R (in a case in which there is only one occupant, who is seated at the driver's seat), regulation by the tether 36 is released by the release device 40. Namely, under the control of the control device 27, the main body portion 44A of the actuator 44 is driven and the rod portion 44B advances, and the intermediate portion of the tether 36 is cut by the cutter 42 attached to the leading end of the rod portion 44B.

Therefore, as illustrated in FIG. 2 and FIG. 4B, the thickness at the lower portion 34D side of the center airbag 34 is thicker than in a case in which there are two occupants, thereby enabling the occupant P1 that is seated at the driver's seat 12L to be effectively restrained by the center airbag 34. Namely, in order to restrain the upper body (the chest region Pc and the abdomen region Pt) of the occupant P1 that is seated at the driver's seat 12L (to suppress movement toward the vehicle width direction inner side) at a time at which, for example, there is a side-on collision at a side door (not illustrated in the drawings) at the front passenger seat side, it is effective to apply a reaction force to the upper body of the occupant P1 earlier, and it is advantageous that the thickness of the center airbag 34, particularly at the lower portion 34 D side, at the time of completion of inflation and deployment, is thicker.

In the first exemplary embodiment, as described above, the tether 36 is cut, and the thickness at the lower portion 34D side of the center airbag 34 at the time of completion of inflation and deployment is set thicker than in a case in which there are two occupants, thereby enabling sufficient restraint performance by the center airbag 34 to be ensured. Therefore, according to the first exemplary embodiment, whether in a case in which there is only one occupant, who is seated at the driver's seat, or in a case in which there are two occupants who are seated at the driver's seat and the front passenger seat, the occupants P1 and P2 can be effectively restrained by the center airbag 34 at a time of a vehicle side-on collision (restraint performance with respect to the occupants P1 and P2 can be ensured).

In addition, in the first exemplary embodiment, the regulating member is a tether 36 that connects the seat width direction outer side base cloth 34A and the seat width direction inner side base cloth 34B of the center airbag 34, and the release device 40 includes the cutter 42 that cuts the tether 36. This enables the thickness of the lower portion 34D side of the center airbag 34 to be increased earlier when the recognition device 28 recognizes that the occupant P2 is not seated at the front passenger seat 12R.

Second Exemplary Embodiment

Next, a second exemplary embodiment will be explained. Note that portions that are the same as those in the above-described first exemplary embodiment are appended with the same reference numerals, and detailed explanation thereof is appropriately omitted.

Figure 5A:
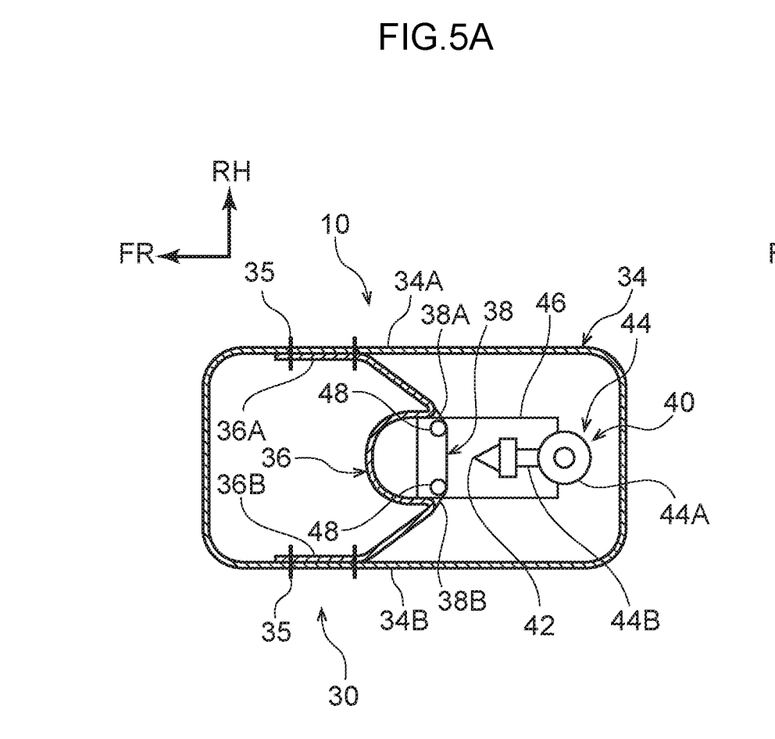
FIG. 5A is a schematic cross-sectional view corresponding to the view along the line X-X in FIG. 3, illustrating the interior of a center airbag of a vehicle occupant restraint device according to a second exemplary embodiment, in a case in which there are two occupants.
Figure 5B:
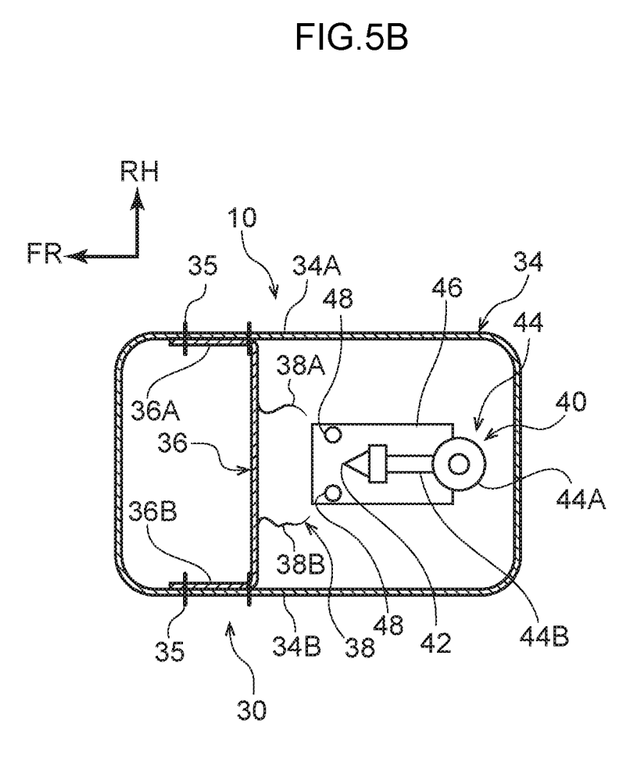
FIG. 5B is a schematic cross-sectional view corresponding to the view along the line X-X in FIG. 3, illustrating the interior of the center airbag of the vehicle occupant restraint device according to the second exemplary embodiment, in a case in which there is one occupant.

As illustrated in FIG. 5A and FIG. 5B, in the second exemplary embodiment, only the configuration of the regulating member is different from that in the above-described first exemplary embodiment. Namely, the regulating member is a tether 36 that connects the seat width direction outer side base cloth 34A and the seat width direction inner side base cloth 34B of the center airbag 34, one end portion 36A side of the tether 36 and another end portion 36B side of the tether 36 being connected together by a thread-like member 38, in a state in which an intermediate portion of the tether 36 is slack. Further, the cutter 42 is configured to cut the thread-like member 38.

Specifically, as illustrated in FIG. 5A and FIG. 5B, one end portion 38A of the thread-like member 38 is sewn and attached to the one end portion 36A side of the tether 36, and another end portion 38B of the thread-like member 38 is sewn and attached to the other end portion 36B side of the tether 36. Further, one end portion 38A side and another end portion 38B side of the thread-like member 38 are hooked on each hooking member 48 from the rear side.

Namely, the intermediate portion of the tether 36 is configured to be disposed in a state in which it is slack further toward the front side than the respective hooking members 48. Further, a configuration is such that, at the interior of the center airbag 34 after inflation and deployment has been completed, between the portions of the thread-like member 38 which are hooked on the respective hooking members 48, can be cut by the cutter 42 that advances, wherein a predetermined tension has been applied to the thread-like member 38 due to the internal pressure of the center airbag 34.

Next, operation of the vehicle occupant restraint device 10 according to the second exemplary embodiment configured as described above will be explained. It should be noted that explanation of operations that are common to those in the above-described first exemplary embodiment is appropriately omitted.

At a time of a vehicle side-on collision, the center airbag 34 is inflated and deployed toward the right side surfaces of the waist region Pw, the abdomen region Pt, the chest region Pc, the shoulder region Ps, and the head Ph of the occupant P1 that is seated at the driver's seat 12L. It should be noted that the thickness of the center airbag 34 is regulated to a thickness that is suitable at a time at which the occupant P2 is seated at the front passenger seat 12R, by the tether 36 provided at the interior of the lower portion 34D side.

Therefore, as illustrated in FIG. 1, in a case in which there are two occupants due to there also being the occupant P2 that is seated at the front passenger seat 12R, the occupant P1 that is seated at the driver's seat 12L and the occupant P2 that is seated at the front passenger seat 12R can be effectively restrained by the center airbag 34.

On the other hand, as illustrated in FIG. 2, when it is recognized by the recognition device 28 that the occupant P2 is not seated at the front passenger seat 12R (in a case in which there is only one occupant, who is seated at the driver's seat), regulation by the tether 36 (the thread-like member 38) is released by the release device 40. Namely, under the control of the control device 27, the main body portion 44A of the actuator 44 is driven and the rod portion 44B advances, and the intermediate portion of the thread-like member 38 is cut by the cutter 42 attached to the leading end of the rod portion 44B.

Therefore, as illustrated in FIG. 2 and FIG. 5B, the thickness at the lower portion 34D side of the center airbag 34 is thicker than in a case in which there are two occupants, thereby enabling the occupant P1 that is seated at the driver's seat 12L to be effectively restrained by the center airbag 34. In this manner, according to the second exemplary embodiment, whether in a case in which there is only one occupant, who is seated at the driver's seat, or in a case in which there are two occupants who are seated at the driver's seat and the front passenger seat, the occupants P1 and P2 can be effectively restrained by the center airbag 34 at a time of a vehicle side-on collision (restraint performance with respect to the occupants P1 and P2 can be ensured).

In addition, in the second exemplary embodiment, the regulating member is a tether 36 that connects the seat width direction outer side base cloth 34A and the seat width direction inner side base cloth 34B of the center airbag 34, the one end portion 36A side of the tether 36 and the other end portion 36B side of the tether 36 being connected together by the thread-like member 38, in a state in which the intermediate portion of the tether 36 is slack, and the release device 40 includes the cutter 42 that cuts the thread-like member 38. This enables the thickness of the lower portion 34D side of the center airbag 34 to be increased earlier when the recognition device 28 recognizes that the occupant P2 is not seated at the front passenger seat 12R.

Further, in the second exemplary embodiment, even if the thickness of the lower portion 34D side of the center airbag 34 is increased, the seat width direction outer side base cloth 34A and the seat width direction inner side base cloth 34B remain connected by the tether 36. This enables the thickness of the center airbag 34 at the lower portion 34D side to be appropriately set in a case in which there is only one occupant, who is seated at the driver's seat.

Third Exemplary Embodiment

Lastly, a third exemplary embodiment will be explained. It should be noted that portions that are the same as those in the above-described first exemplary embodiment are appended with the same reference numerals, and detailed explanation thereof is appropriately omitted.

Figure 6A:
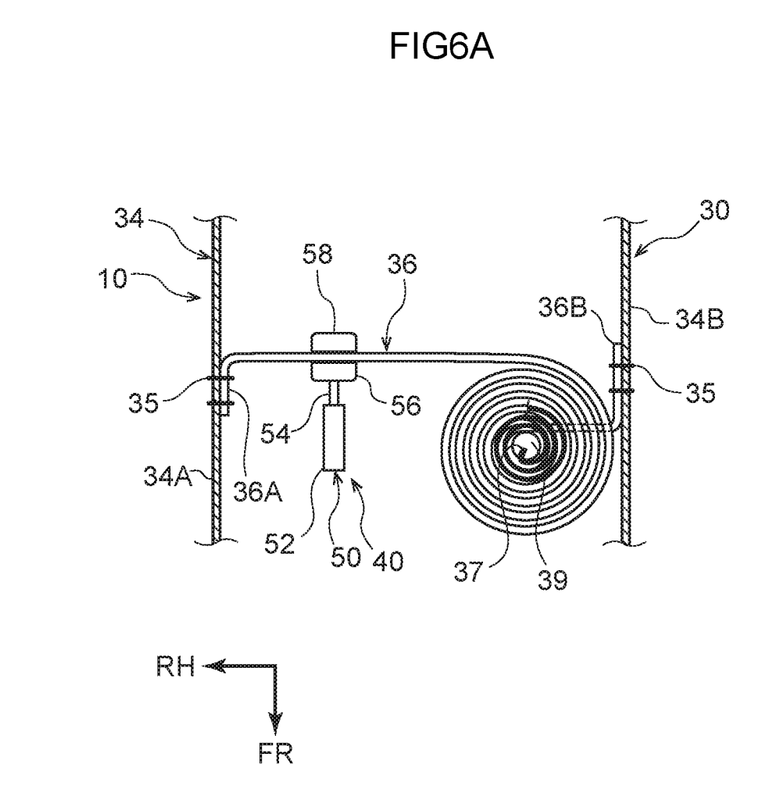
FIG. 6A is a schematic cross-sectional view corresponding to the view along the line X-X in FIG. 3, illustrating the interior of a center airbag of a vehicle occupant restraint device according to a third exemplary embodiment, in a case in which there are two occupants.
Figure 6B:
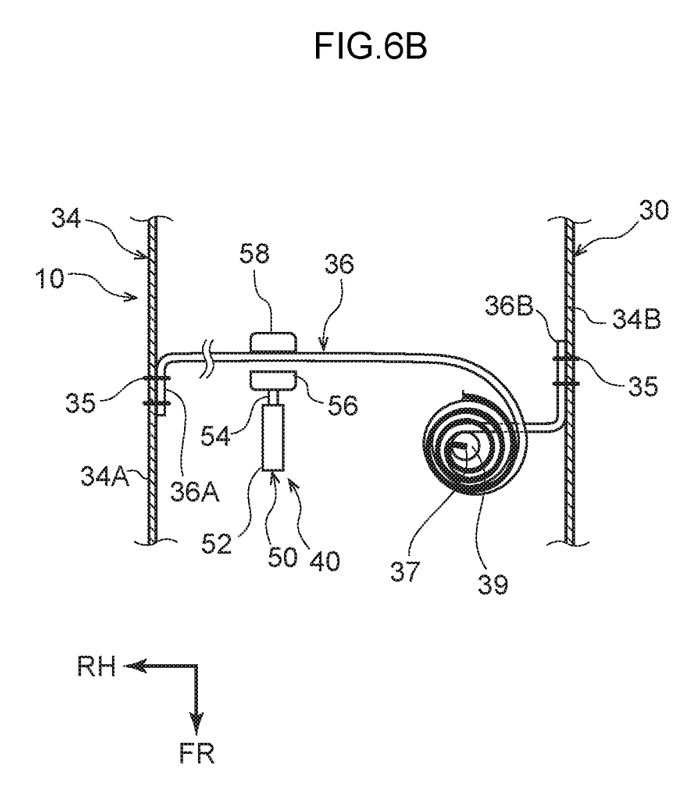
FIG. 6B is a schematic cross-sectional view corresponding to the view along the line X-X in FIG. 3, illustrating the interior of a center airbag of a vehicle occupant restraint device according to the third exemplary embodiment, in a case in which there is one occupant.

As illustrated in FIG. 6A and FIG. 6B, in the third exemplary embodiment, the configuration of the regulating member and the configuration of the release device 40 are different from those in the above-described first exemplary embodiment. Namely, the regulating member is a tether 36 that connects the seat width direction outer side base cloth 34A and the seat width direction inner side base cloth 34B of the center airbag 34, the tether 36 being taken up against an urging force by which one end portion 36A side of the tether 36 is urged in a counter-winding direction (an unwinding direction, which is a direction toward the seat width direction outer side). Further, the release device 40 is configured with an actuator 50 that is capable of locking and unlocking the tether 36 that has been taken up.

Specifically, as illustrated in FIG. 6A and FIG. 6B, a pedestal (not illustrated in the drawings) is provided at the interior of the center airbag 34, and a take-up shaft 39 that has an up-down direction as an axial direction is provided projecting from an upper face of the pedestal. A spiral spring 37 that urges the tether 36 in the counter-winding direction is attached to the take-up shaft 39, and another end portion 36B side of the tether 36 is taken up by the spiral spring 37 against the urging force of the spiral spring 37. Further, an intermediate portion of the tether 36 in the taken-up state is locked so as not to non-movable by the actuator 50.

The actuator 50 is an air cylinder or the like that is electrically connected to the control device 27 (see FIG. 1 and FIG. 2), and is configured with a main body portion 52 that is disposed at the upper face of the pedestal, a rod portion 54 that is configured so as to be capable of entering and exiting the main body portion 52, and a pressing portion 56 that is attached to a leading end of the rod portion 54. Further, a pressed portion 58 for sandwiching the intermediate portion of the tether 36 with the pressing portion 56 is projectingly provided and fixed to the pedestal.

Therefore, under the control of the control device 27, the rod portion 54 projects out from the main body portion 52, and the intermediate portion of the tether 36 is sandwiched at a predetermined pressure by the pressing portion 56 and the pressed portion 58 that is fixed to the pedestal, such that the tether 36 is locked so as to be non-movable. Further, a configuration is such that the tether 36 is unlocked so as to be capable of moving due to the urging force of the spiral spring 37, by the rod portion 54 retracting into the main body portion 52 and moving away from the intermediate portion of the tether 36, under control of the control device 27.

Next, operation of the vehicle occupant restraint device 10 according to the third exemplary embodiment configured as described above will be explained. It should be noted that explanation of operations that are common to those in the first exemplary embodiment is appropriately omitted.

At a time of a vehicle side-on collision, the center airbag 34 is inflated and deployed toward the right side surfaces of the waist region Pw, the abdomen region Pt, the chest region Pc, the shoulder region Ps, and the head Ph of the occupant P1 that is seated at the driver's seat 12L. It should be noted that the thickness of the center airbag 34 is regulated to a thickness that is suitable at a time at which the occupant P2 is seated at the front passenger seat 12R, by the tether 36 provided at the interior of the lower portion 34D side.

Therefore, as illustrated in FIG. 1, in a case in which there are two occupants due to there also being the occupant P2 who is seated at the front passenger seat 12R, the occupant P1 that is seated at the driver's seat 12L and the occupant P2 that is seated at the front passenger seat 12R can be effectively restrained by the center airbag 34.

On the other hand, as illustrated in FIG. 2, when it is recognized by the recognition device 28 that the occupant P2 is not seated at the front passenger seat 12R (in a case in which there is only one occupant, who is seated at the driver's seat), regulation by the tether 36 is released by the release device 40. Namely, under the control of the control device 27, the main body portion 52 of the actuator 50 is driven and the rod portion 54 retracts inside the main body portion 52, and the pressing portion 56, which has sandwiched the intermediate portion of the tether 36 with the pressed portion 58 at a predetermined pressure, is separated from the tether 36. When this occurs, the tether 36 is unwound in the counter-winding direction due to the urging force of the spiral spring 37 and the internal pressure of the center airbag 34.

Therefore, as illustrated in FIG. 2 and FIG. 6B, the thickness at the lower portion 34D side of the center airbag 34 is thicker than in a case in which there are two occupants, thereby enabling the occupant P1 that is seated at the driver's seat 12L to be effectively restrained by the center airbag 34. Therefore, according to the third exemplary embodiment, whether in a case in which there is only one occupant, who is seated at the driver's seat, or in a case in which there are two occupants who are seated at the driver's seat and the front passenger seat, the occupants P1 and P2 can be effectively restrained by the center airbag 34 at a time of a vehicle side-on collision (restraint performance with respect to the occupants P1 and P2 can be ensured).

In addition, in the third exemplary embodiment, the regulating member is a tether 36 that connects the seat width direction outer side base cloth 34A and the seat width direction inner side base cloth 34B of the center airbag 34, the tether 36 being taken up against the urging force by which the one end portion 36A side of the tether 36 is urged in the counter-winding direction, and the release device 40 is configured with the actuator 50 that is capable of locking and unlocking the tether 36 that has been taken up. This enables the thickness of the lower portion 34D side of the center airbag 34 to be increased earlier when the recognition device 28 recognizes that the occupant P2 is not seated at the front passenger seat 12R.

Further, in the third exemplary embodiment, even if the thickness of the lower portion 34D side of the center airbag 34 is increased, the seat width direction outer side base cloth 34A and the seat width direction inner side base cloth 34B remain connected by the tether 36. This enables the thickness of the center airbag 34 at the lower portion 34D side to be appropriately set in a case in which there is only one occupant, who is seated at the driver's seat.

Although the vehicle occupant restraint device 10 according to the present exemplary embodiments has been explained above based on the drawings, the vehicle occupant restraint device 10 according to the present exemplary embodiments is not limited to that which is illustrated in the drawings, and appropriate design modifications can be implemented within a range that does not depart from the gist of the present disclosure. For example, the recognition device 28 that recognizes whether the occupant P2 is seated at the front passenger seat 12R may be a camera (not illustrated in the drawings) or the like that is electrically connected to the control device 27. Further, the regulating member and the release device 40 are not limited to those of the illustrated configuration.

What is claimed is:

1. A vehicle occupant restraint device, comprising:
   a driver's seat and a front passenger seat, the driver's seat and the front passenger seat being provided at an interior of a vehicle;
   a recognition device, the recognition device being configured to recognize whether or not an occupant is seated at the front passenger seat;
   a center airbag, the center airbag being provided at a side portion at a vehicle width direction inner side of a seatback of the driver's seat, and the center airbag being configured to inflate and deploy toward a vehicle width direction inner side of an occupant seated at the driver's seat due to gas ejected from an inflator being supplied to an interior of the center airbag;
   a regulating member, the regulating member being provided at the interior of the center airbag, and the regulating member being configured to regulate a thickness of the center airbag to a thickness that is suitable at a time at which an occupant is seated at the front passenger seat; and
   a release device, the release device being provided at the interior of the center airbag, and the release device being configured to release regulation by the regulating member, at a time at which a side-on collision of the vehicle is detected or at a time at which a side-on collision of the vehicle is predicted, in a case in which the recognition device has recognized that an occupant is not seated at the front passenger seat.

2. The vehicle occupant restraint device according to claim 1, wherein:
   the regulating member is a tether that connects a seat width direction outer side base cloth of the center airbag and a seat width direction inner side base cloth of the center airbag, and
   the release device includes a cutter that is configured to cut the tether.

3. The vehicle occupant restraint device according to claim 1, wherein:
   the regulating member is a tether that connects a seat width direction outer side base cloth of the center airbag and a seat width direction inner side base cloth of the center airbag, one end portion side of the tether and another end portion side of the tether being connected by a thread-like member, in a state in which an intermediate portion of the tether is slack, and
   the release device includes a cutter that is configured to cut the thread-like member.

4. The vehicle occupant restraint device according to claim 1, wherein:
   the regulating member is a tether that connects a seat width direction outer side base cloth of the center airbag and a seat width direction inner side base cloth of the center airbag, the tether being taken up against an urging force that urges one end portion side of the tether in a counter-winding direction, and
   the release device is configured by an actuator that is configured to lock and to unlock the tether that has been taken up.

\* \* \* \* \*